Figure 1A:
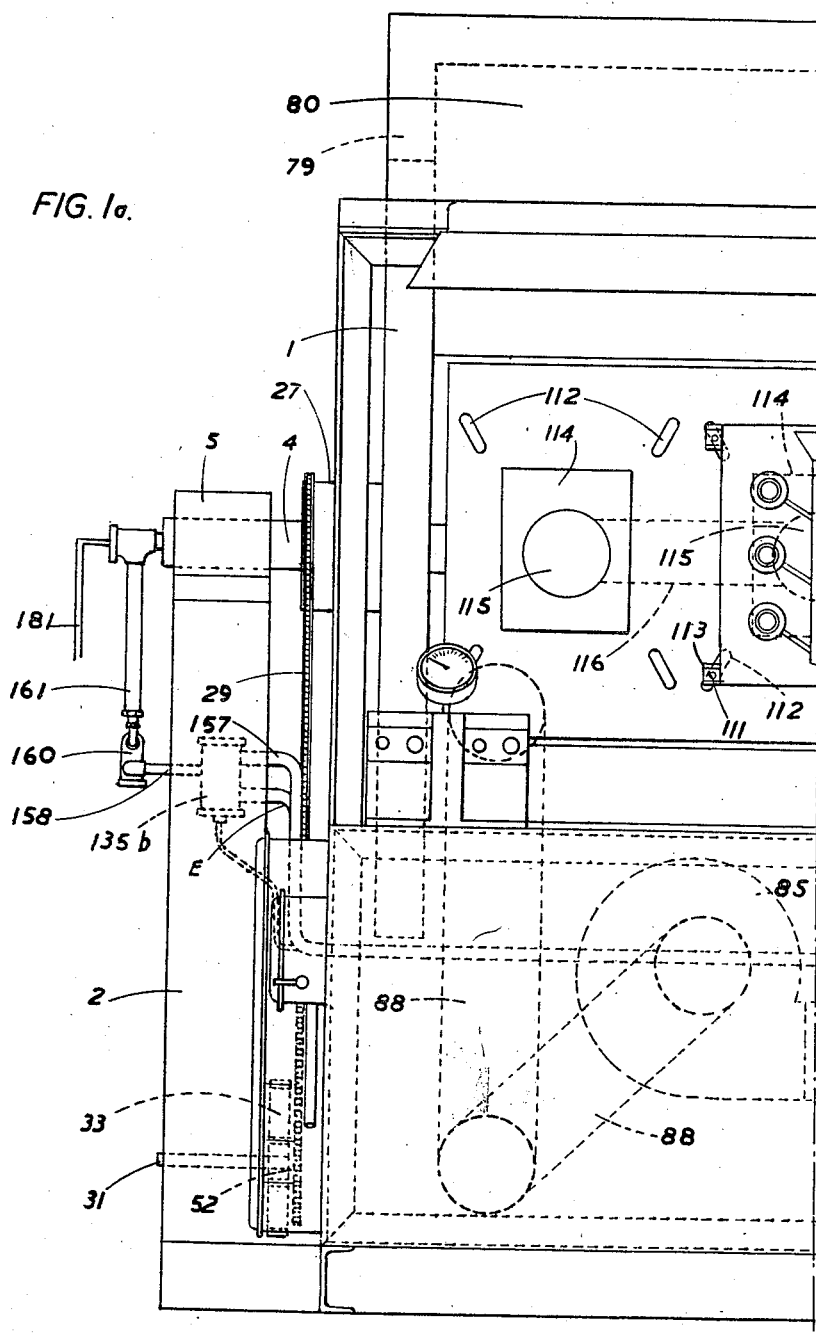

Jan. 22, 1957  R. D. CHEYNE  2,778,073
APPARATUS FOR PRODUCING SHELL MOLDS
Filed June 14, 1952  18 Sheets-Sheet 1

Inventor
ROBERT DOUGLAS CHEYNE
By Leon M. Strauss
Agt.

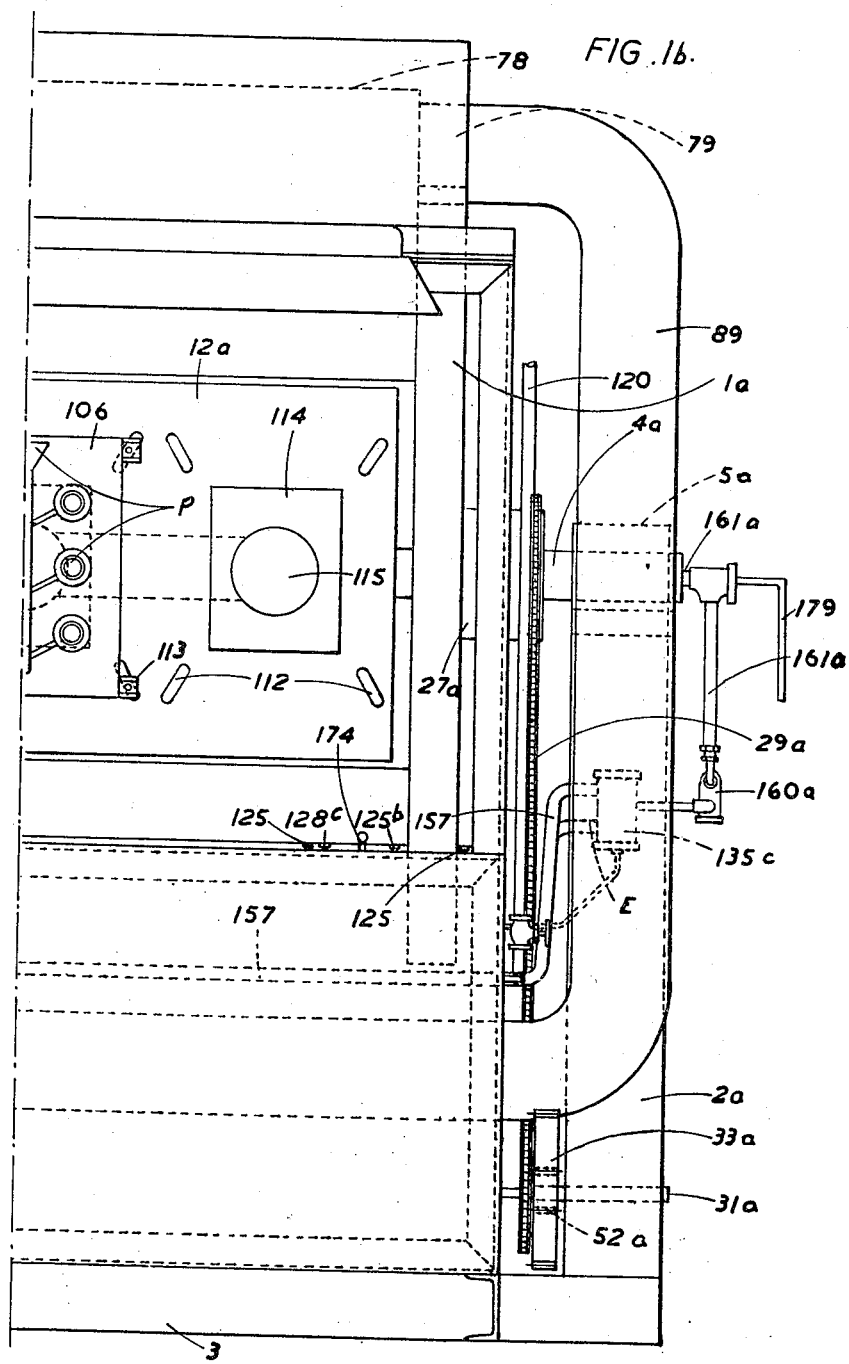

Jan. 22, 1957   R. D. CHEYNE   2,778,073
APPARATUS FOR PRODUCING SHELL MOLDS
Filed June 14, 1952   18 Sheets-Sheet 3

Inventor
ROBERT DOUGLAS CHEYNE

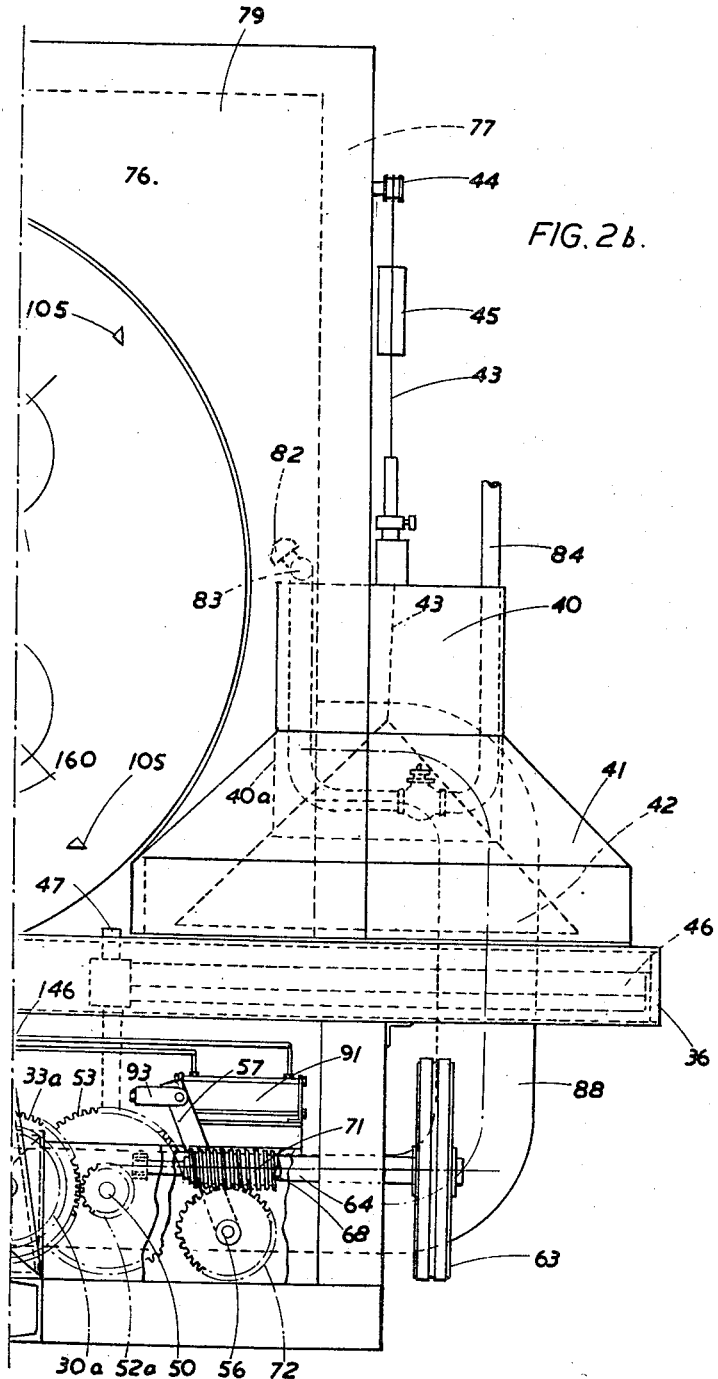

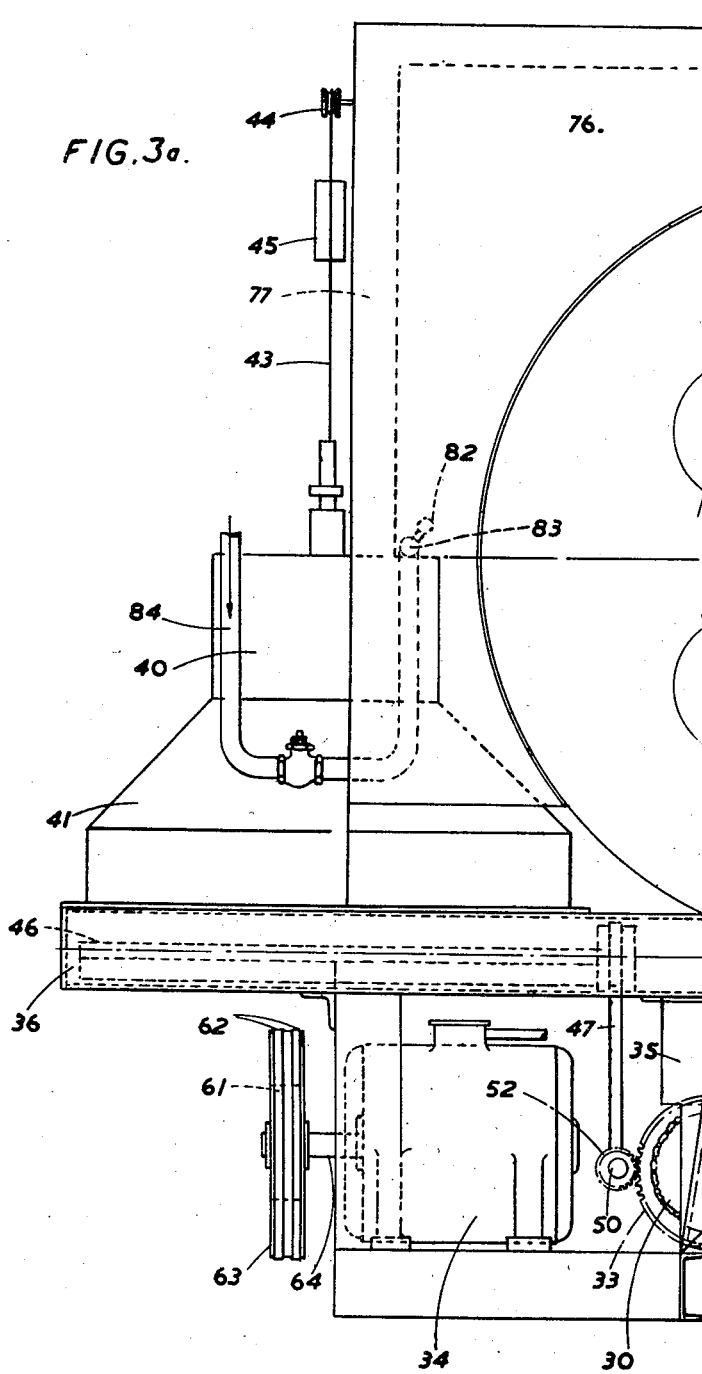

Jan. 22, 1957   R. D. CHEYNE   2,778,073
APPARATUS FOR PRODUCING SHELL MOLDS
Filed June 14, 1952   18 Sheets-Sheet 6

Inventor
ROBERT DOUGLAS CHEYNE
By
Leon M. Strauss
AGT.

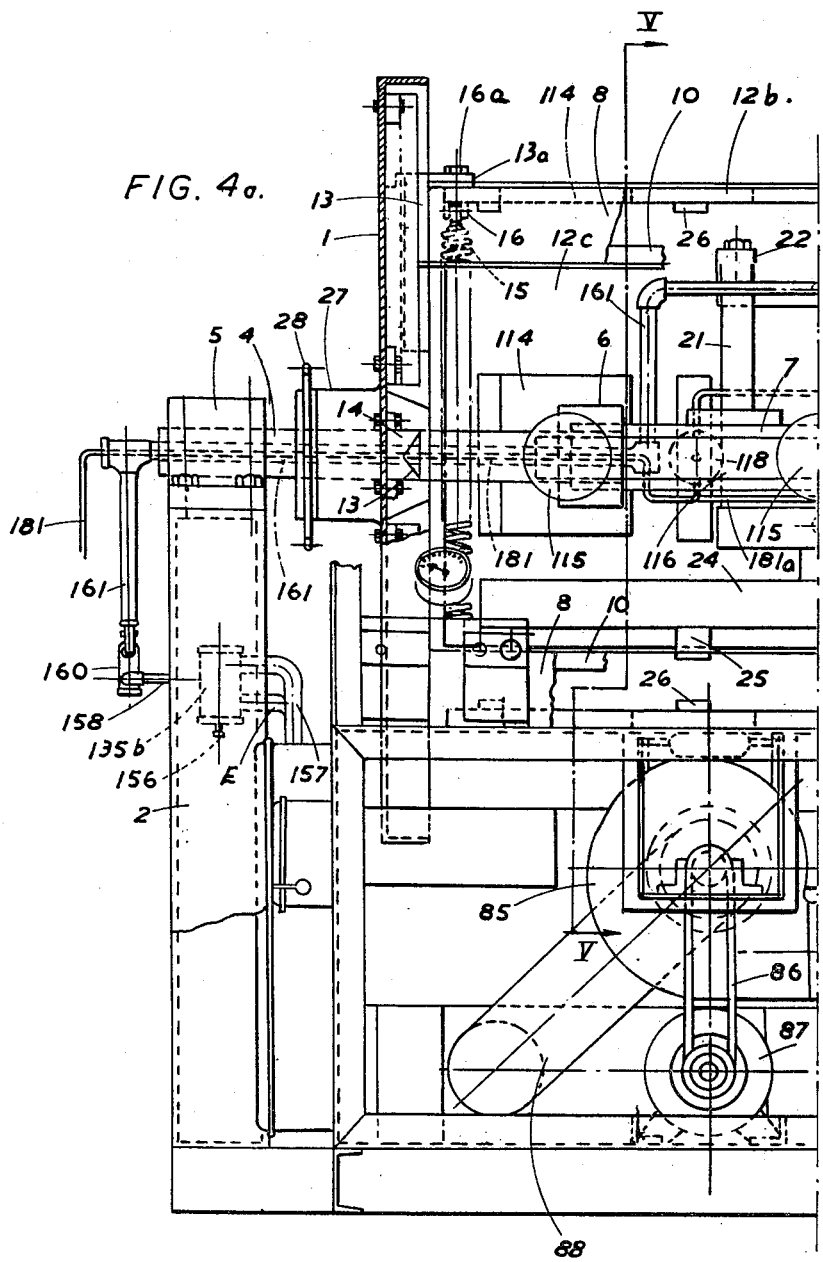

Jan. 22, 1957    R. D. CHEYNE    2,778,073
APPARATUS FOR PRODUCING SHELL MOLDS
Filed June 14, 1952    18 Sheets-Sheet 8

Inventor
ROBERT DOUGLAS CHEYNE
By Leon M. Strauss
Agt.

Jan. 22, 1957   R. D. CHEYNE   2,778,073
APPARATUS FOR PRODUCING SHELL MOLDS
Filed June 14, 1952   18 Sheets-Sheet 9

Inventor
ROBERT DOUGLAS CHEYNE
By
Leon M. Strauss
Agt.

Jan. 22, 1957 R. D. CHEYNE 2,778,073
APPARATUS FOR PRODUCING SHELL MOLDS
Filed June 14, 1952 18 Sheets-Sheet 11

FIG. 7.

Inventor
ROBERT DOUGLAS CHEYNE
By
Leon M. Strauss
Att

Jan. 22, 1957 R. D. CHEYNE 2,778,073
APPARATUS FOR PRODUCING SHELL MOLDS
Filed June 14, 1952 18 Sheets-Sheet 12

Inventor
ROBERT DOUGLAS CHEYNE
By
Geon M. Strauss
Agt.

Jan. 22, 1957  R. D. CHEYNE  2,778,073
APPARATUS FOR PRODUCING SHELL MOLDS
Filed June 14, 1952  18 Sheets-Sheet 13

Inventor:
ROBERT DOUGLAS CHEYNE
By

Jan. 22, 1957 R. D. CHEYNE 2,778,073
APPARATUS FOR PRODUCING SHELL MOLDS
Filed June 14, 1952 18 Sheets-Sheet 14
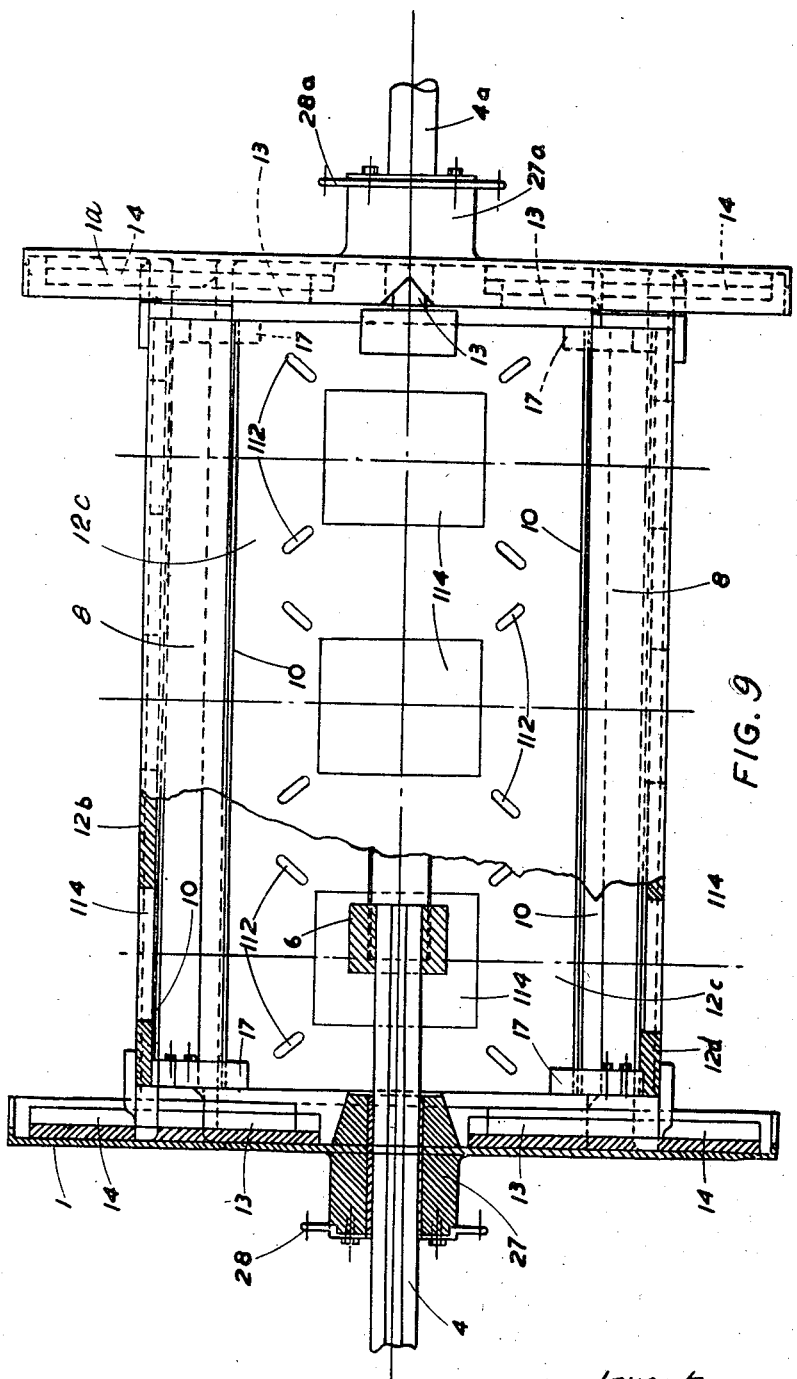
Inventor
ROBERT DOUGLAS CHEYNE
By Leon M. Strauss Jan. 22, 1957 R. D. CHEYNE 2,778,073
APPARATUS FOR PRODUCING SHELL MOLDS
Filed June 14, 1952 18 Sheets-Sheet 15

Inventor:
ROBERT DOUGLAS CHEYNE
By Leon M. Strauss
Agt

Jan. 22, 1957 R. D. CHEYNE 2,778,073
APPARATUS FOR PRODUCING SHELL MOLDS
Filed June 14, 1952 18 Sheets-Sheet 16
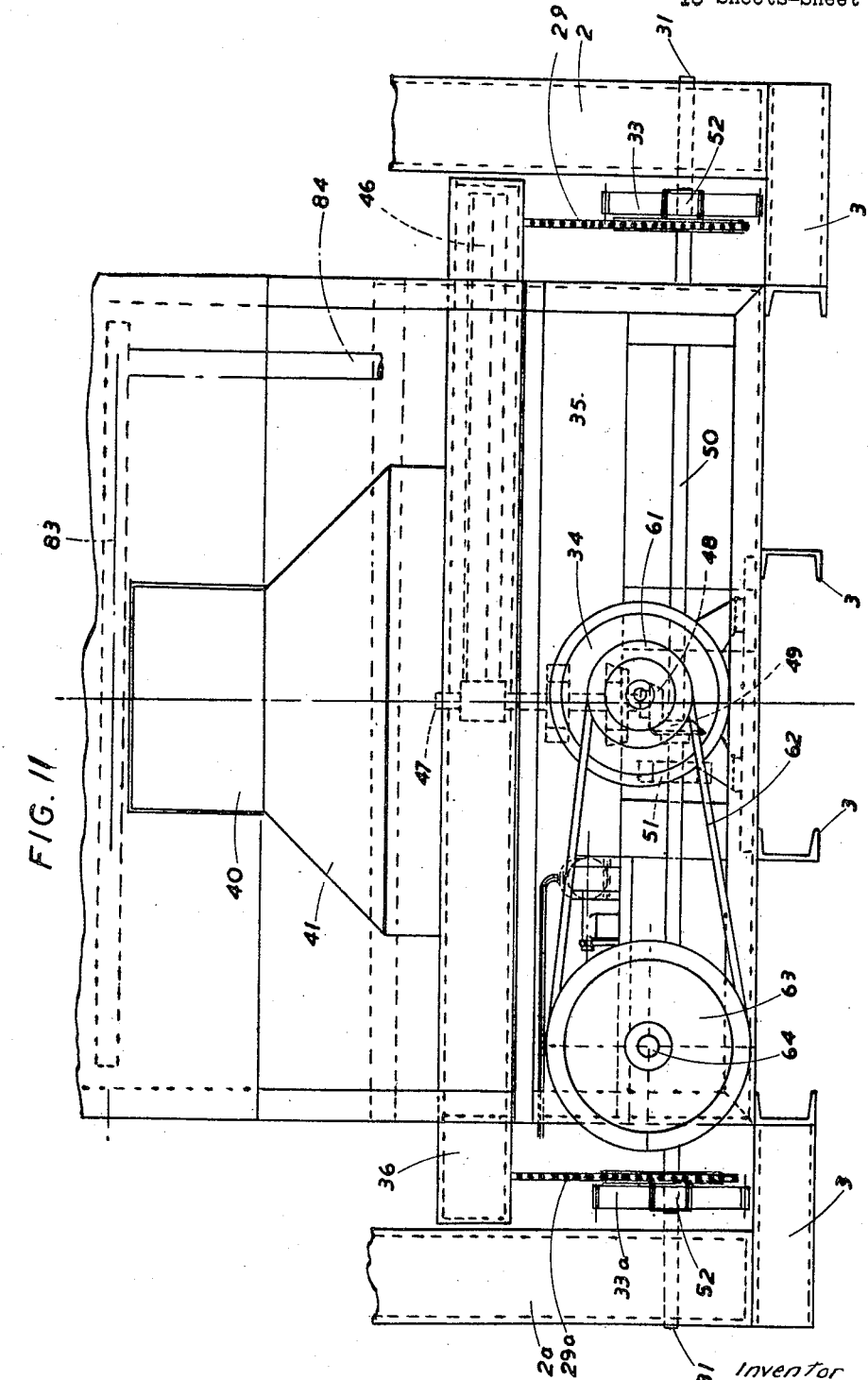
Inventor
ROBERT DOUGLAS CHEYNE
By Leon M. Strauss Jan. 22, 1957   R. D. CHEYNE   2,778,073
APPARATUS FOR PRODUCING SHELL MOLDS
Filed June 14, 1952   18 Sheets-Sheet 18
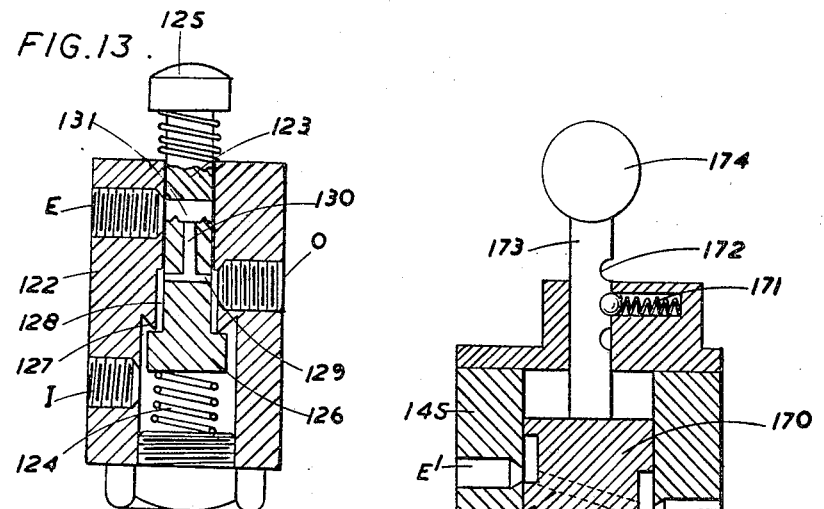
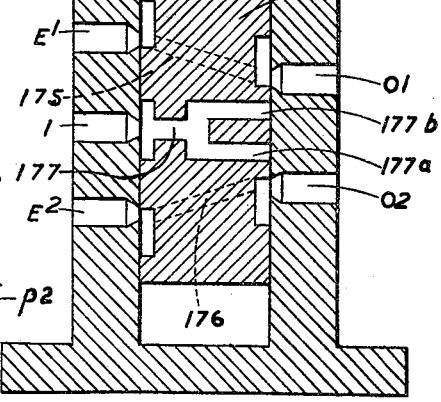
FIG. 16
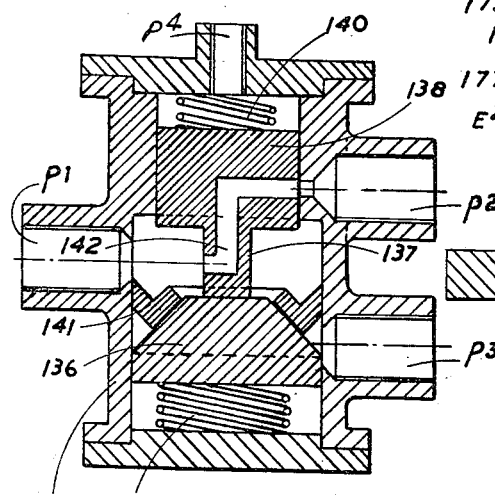
FIG. 14
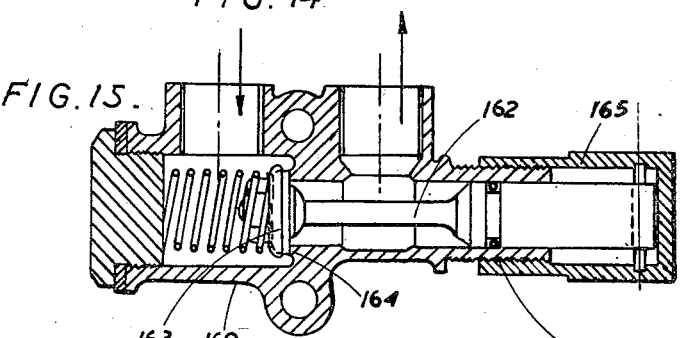
Inventor:
ROBERT DOUGLAS CHEYNE United States Patent Office 2,778,073
Patented Jan. 22, 1957

2,778,073

APPARATUS FOR PRODUCING SHELL MOLDS

Robert Douglas Cheyne, Gunnersbury, London, England, assignor to Polygram Casting Company Limited, London, England Application June 14, 1952, Serial No. 293,528

Claims priority, application Great Britain June 23, 1951

9 Claims. (Cl. 22—20)

This invention relates to a method of making thin walled hollow articles such as casting moulds and parts of such moulds from a dry finely divided moulding mixture comprising a finely divided granular material and a finely divided thermosetting resin which will act as a binder for the granular material without derogating from the permeability to gases and the refractoriness required in the finished mould for casting purposes.

A suitable mixture is sand and a phenol formaldehyde resin. Cresol resins and urea resins may also be used, although a phenol formaldehyde resin gives greater strength in the finished mould. The mixture may comprise from 2½% to 12% by weight of the resin with a hardening agent such as hexamine in the proportion of about 10% of the resin, the remainder of the mixture being sand, although in order to improve the finish of the castings produced from the moulds, plumbago or terraflake in the proportion of 1% to 3% of the total mixture may be added.

One suitable mixture is as follows:

| | Percent |
|---|---|
| Sand | 90 |
| Phenol formaldehyde resin | 8 |
| Hexamine | 1 |
| Plumbago | 1 |

The thickness of the coating of moulding mixture on the pattern depends on the time for which the pattern is embedded in the mixture. For a thickness of from ⅛ inch to 5/32 inch, a time of four to five seconds is sufficient to form the coating, further exposure to heat being required to complete its setting.

A main object of the invention is to provide a method of making relatively thin walled hollow articles from such mixtures which will facilitate continuous operation and mass production of said articles.

A further object of the invention is to provide an apparatus for carrying out the method.

According to the present invention a method of making thin walled hollow articles, for example, casting moulds and parts thereof, from a dry moulding mixture of the kind referred to, consists in heating a pattern to a temperature sufficient to cause softening and at least partial setting of the resin constituent of the mixture, coating said heated pattern with a substance which will facilitate removal of the finished article therefrom, pressing the heated and coated pattern into the moulding mixture under a pressure, and for a time, sufficient to cause the pattern to become invested with a coating of the mixture, withdrawing the pattern from the mixture, curing the coating thereon by further exposure to heat, and removing the cured coating from the pattern.

The method according to the invention lends itself to mass production of the articles made in accordance therewith, and, according to a feature of the invention, a method of mass producing thin walled hollow articles, such as casting moulds and parts thereof, from a dry moulding mixture of the kind above referred to, consists in repeatedly passing each of a series of patterns in turn from a first station to an investment station and thence through an oven back to the first station, coating each pattern, when at said first station, with a substance which will facilitate removal of the finished article therefrom, pressing each pattern, when at the investment station, into a bed of the moulding mixture under a pressure, and for a time sufficient to cause the pattern to become invested with a coating of the mixture, and then withdrawing the coated pattern from the mixture, and removing the coating, cured by its passage through the oven, from the pattern, on the return of the latter to said first station.

The oven is maintained at a temperature such that each pattern, while passing from the oven to the investment station, retains sufficient heat to cause softening and at least partial setting of the resin constituent of the mixture, the oven temperature being also sufficient to cure the mixture coatings during their passage through the oven from the investing station to said first station.

The substance with which the pattern is coated in order to facilitate separation of the finished article therefrom preferably comprises a wax, and suitable substances for this purpose are described in British patent specification No. 677,434, for example a mixture comprising Montan wax and paraffin in the proportions of one ounce of the wax to one pint of paraffin.

Apparatus for carrying out the method according to the invention may comprise a plurality of pattern supports, means for moving each pattern support in turn from a first station to an investing station and thence through an oven back to the first station, a mixture container disposed below the investing station and means for moving each pattern support, when at the investing station, towards the container under pressure to press a pattern, attached to the support into moulding mixture in said container, and then to withdraw said pattern support away from said container.

The pattern supports are moved from the first station to the investing station, through the oven, and back to the first station by a carrier to which the pattern supports are attached.

For example the carrier may be in the form of an endless band or conveyor, in which case the lower run of the band or conveyor will pass over the mixture container while the upper run passes the first station, the portions of the lower and upper runs which extend from the investing station to the loading station serving to convey the pattern through the oven.

Preferably, however, the apparatus comprises a plurality of pattern supports in the form of flat tables arranged to form a polygonal drum disposed between two rotatable carrier members mounted for rotation coaxially with the drum, the tables being supported by the carrier members and guided for radial movement relatively thereto, a container for moulding mixture disposed below the drum, means for rotating the drum intermittently to bring each table in turn from the first station to the investing station at which it is located over the mixture container, and thence through the oven back to the first station, and means located at the investing station to engage said table, when positioned at said station, and push it down under pressure into the container under spring action.

In a preferred embodiment the carrier members are in the form of two circular plates and the drum comprises four pattern supporting tables arranged at right angles to one another so that the cross section of the drum is square.

The means for pushing the tables down into the container may comprise a ram and actuating means therefor, for example a compressed air operated piston within a cylinder, mounted on fixed supports within the rotatable drum, said ram being disposed over the container so that each table is positioned in turn below the ram and over the container.

The apparatus according to the invention is particularly intended for use with pattern plates which have the patterns formed integrally therewith and which have a device for ejecting a finished article from the pattern plate, and according to a further feature of the invention the apparatus includes means located at the first station and operable to actuate the ejecting device of the pattern plate when the table to which it is attached is positioned at said first station.

Figure 2A:
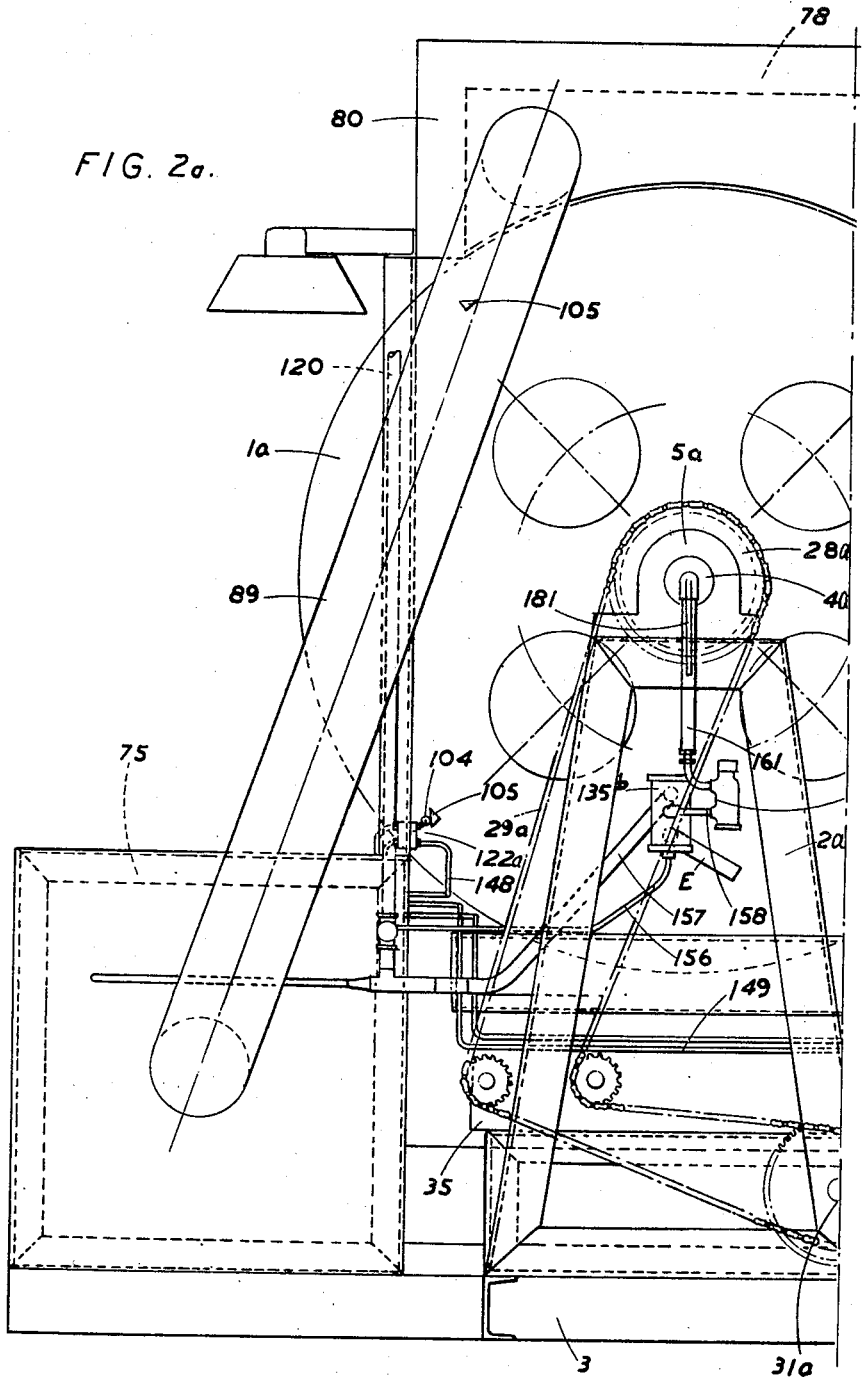
Figure 3B:
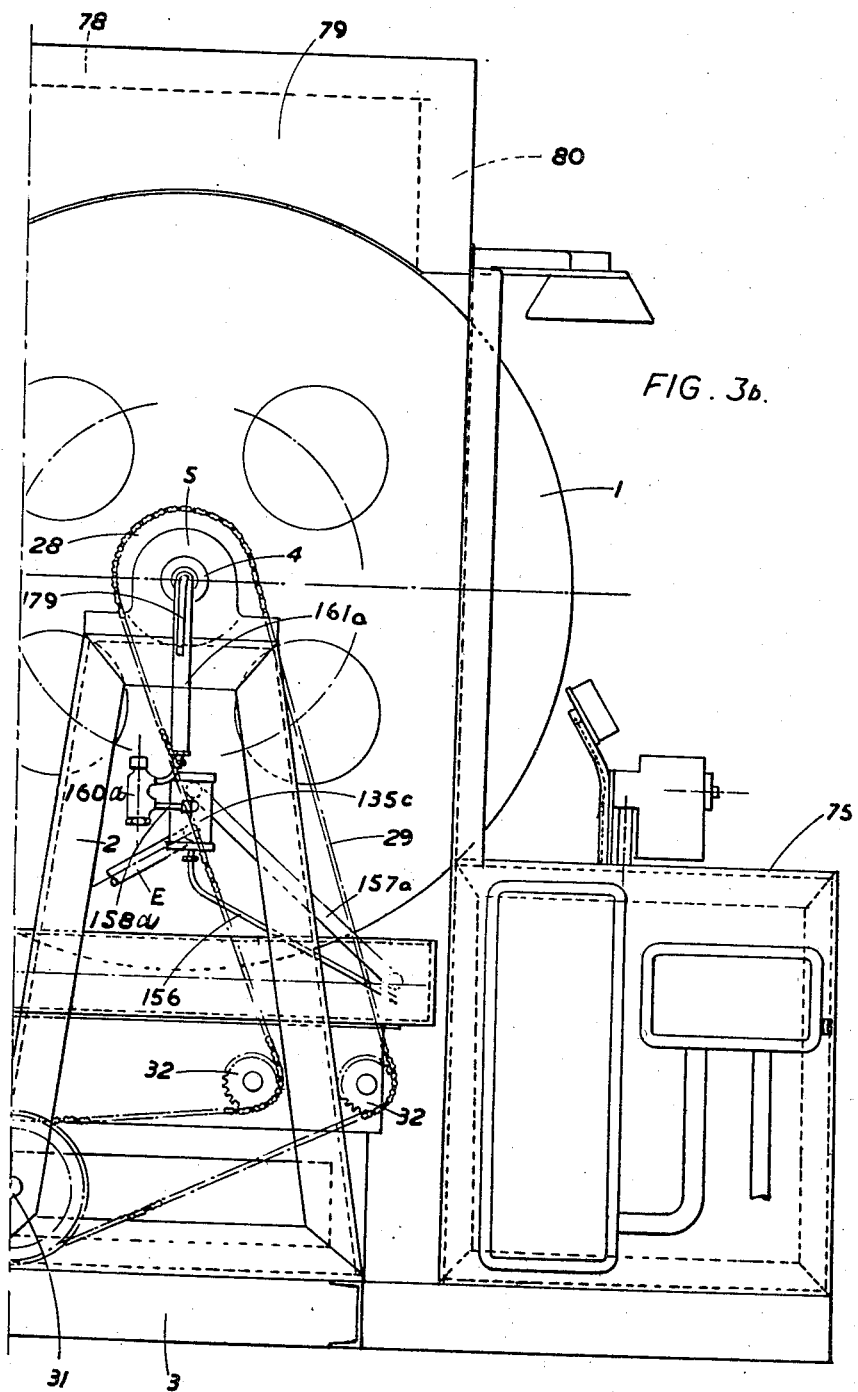
Figure 4B:
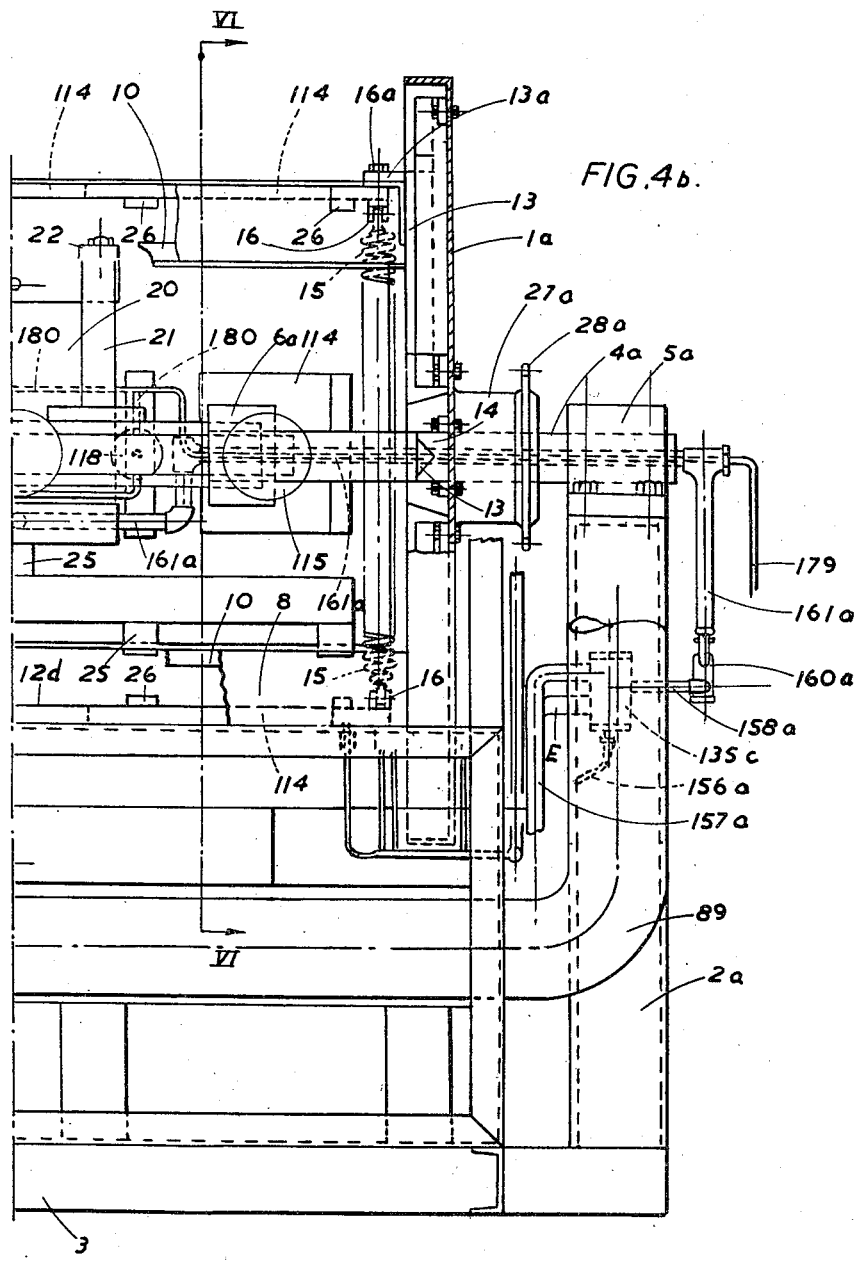
Figure 5:
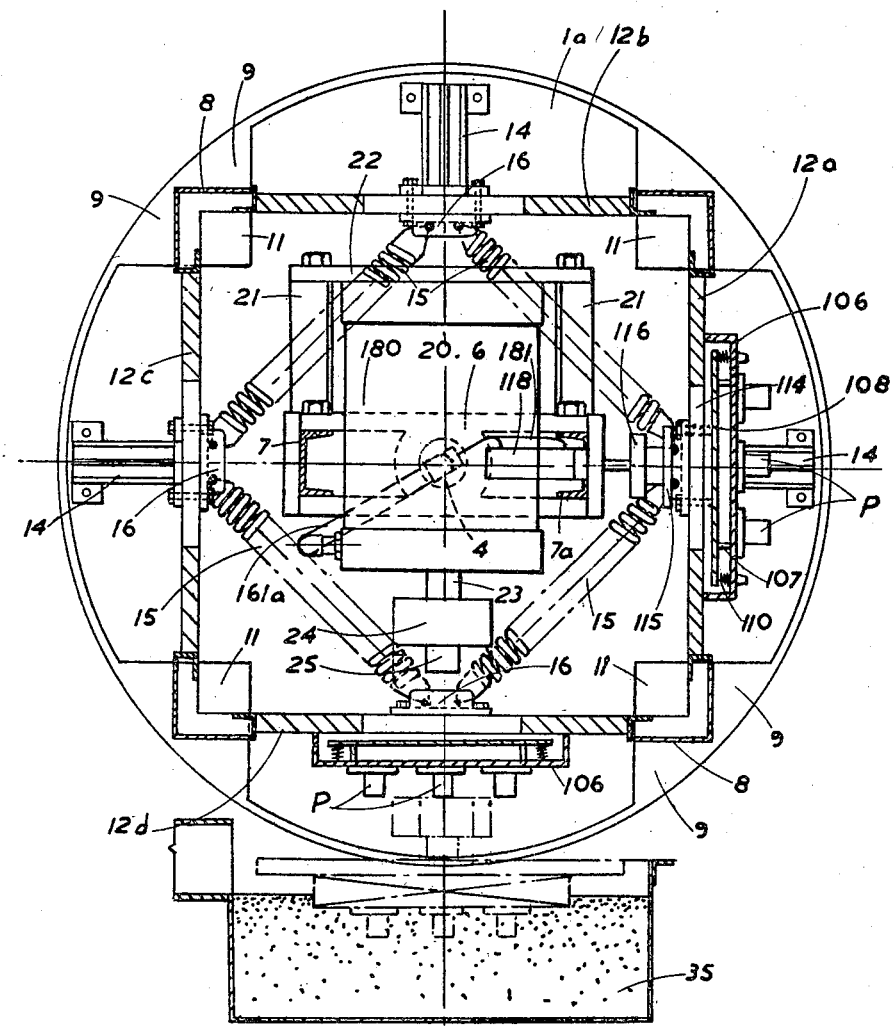
Figure 6:
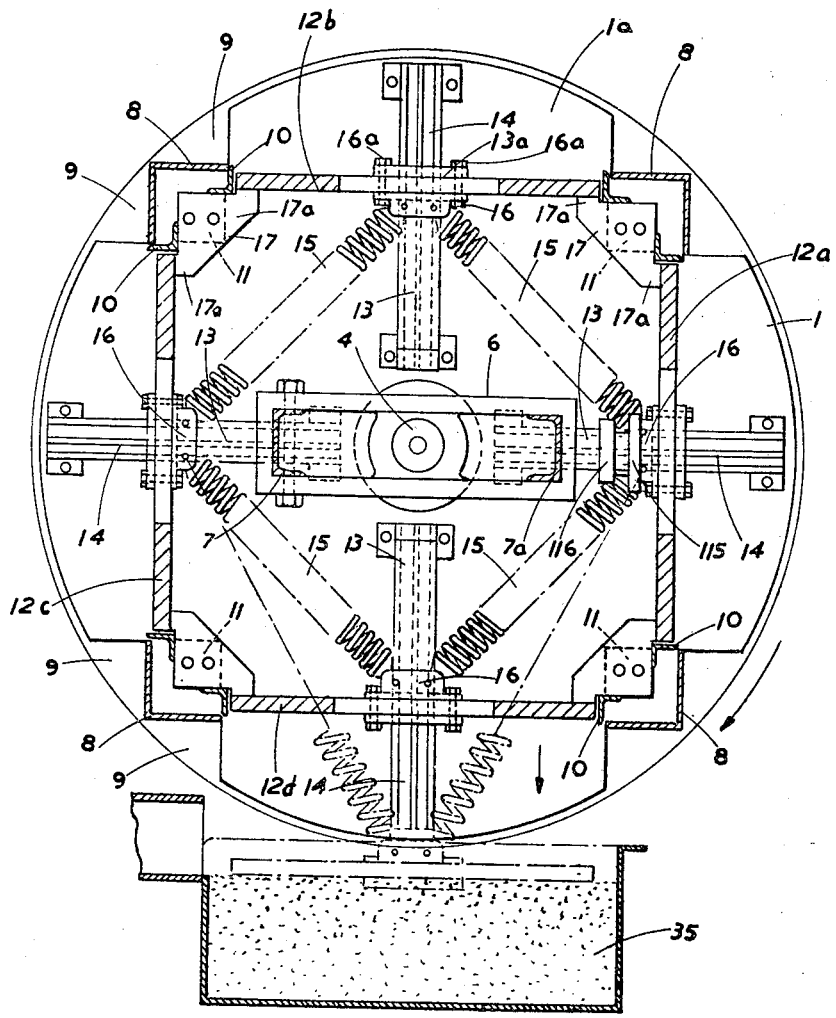
Figure 8A:
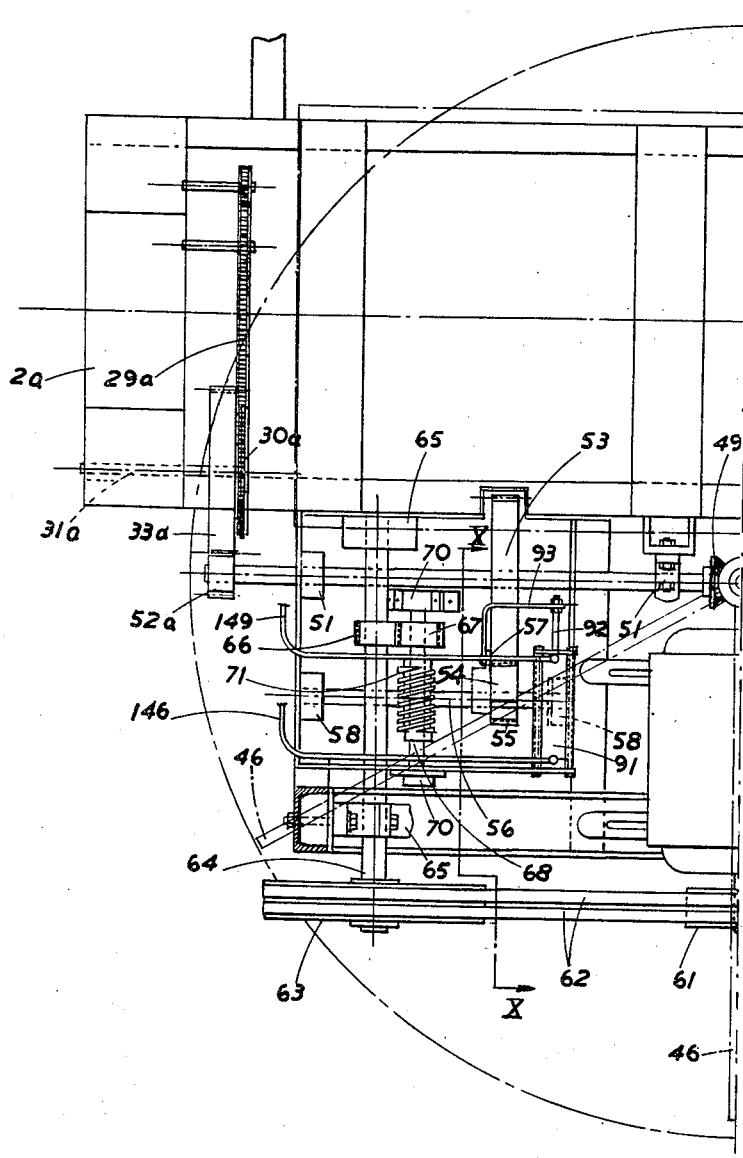
Figure 8B:
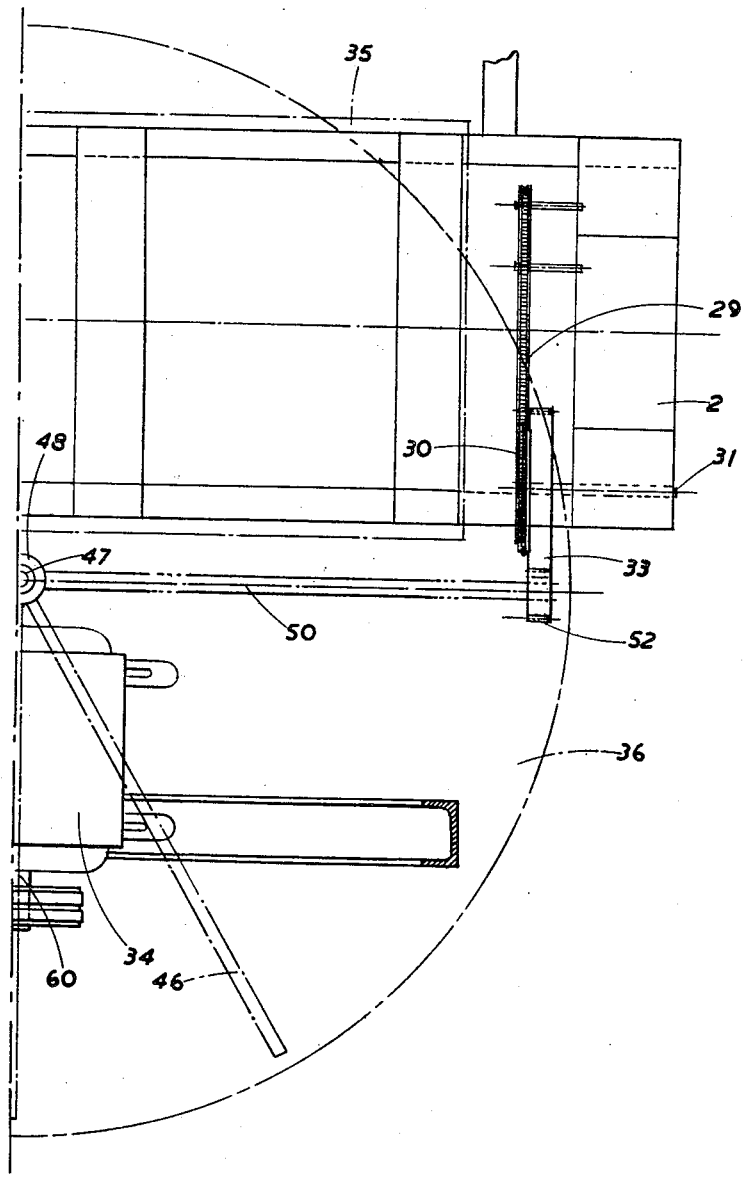
Figure 10:
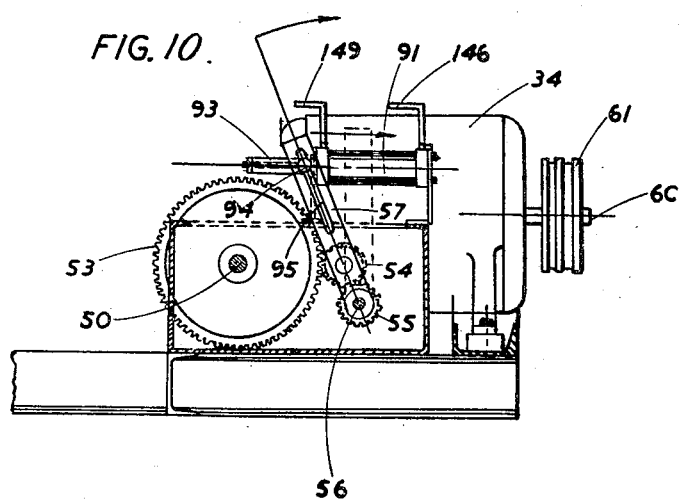
Figure 17:
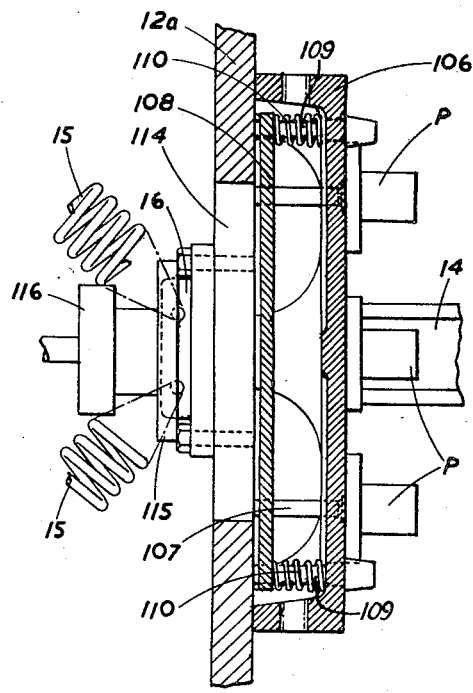
Figure 12:
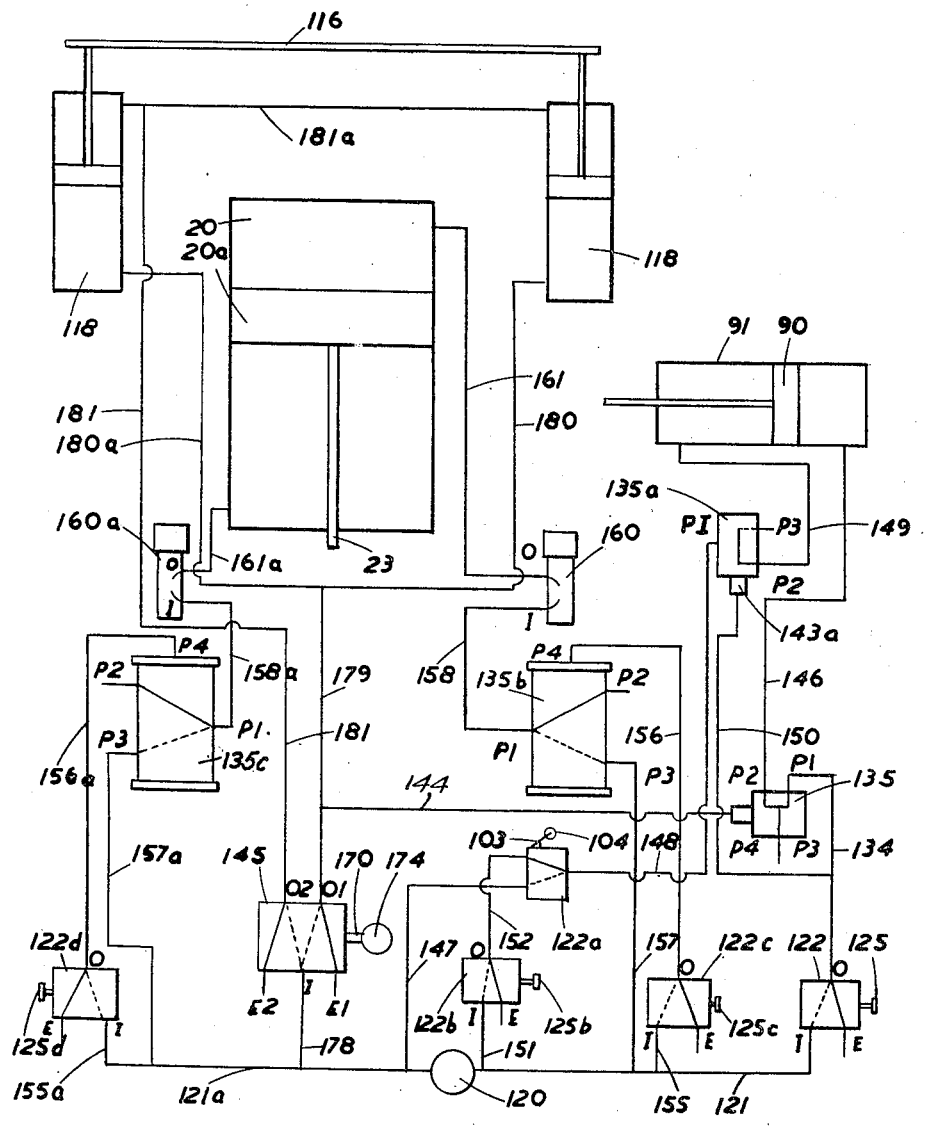

In order that the invention may be more completely understood, one embodiment of the apparatus, according thereto, will now be described with reference to the accompanying diagrammatic drawings in which:

Figures 1a and 1b which together form Figure 1 show the apparatus in front elevation, Figures 2a and 2b which together form Figure 2 show a right-hand side elevation of the apparatus, Figures 3a and 3b which together form Figure 3 show a left-hand side elevation of the apparatus, Figures 4a and 4b which together form Figure 4 show a front elevation with the oven unit and the front cover panel of the base section of the machine removed and also with the front pattern table removed, Figure 5, shows a vertical section on the line V—V in Figure 4a, Figure 6 shows a vertical section on the line VI—VI in Figure 4b, Figure 7 is a plan of the apparatus with the oven unit and upper-most pattern table removed, Figures 8a and 8b which together form Figure 8 show a plan of the operating mechanism in the base section of the machine, Figure 9 shows the unit comprising the flanged plates and the pattern supporting tables partly in section, Figure 10 is a detail view of part of the mechanism in the base section, being a section on the line X—X in Figure 8a, Figure 11 is a rear view of the base section of the machine, Figure 12 is a diagram of the compressed air control system for the apparatus, Figures 13 to 16 show details of certain valves forming part of said compressed air control system, and Figure 17 illustrates a detail of a pattern plate used in the apparatus of the invention.

In the construction shown in the drawings, the apparatus comprises two circular flanges plates 1 and 1a spaced apart and rotatably supported in standards 2, 2a extending from a base structure indicated generally at 3.

Each of the plates 1, 1a is rotatable on a respective hollow trunnion 4, 4a, said trunnion being fixed in housings 5, 5a carried at the upper ends of the standards 2, 2a.

To the inner end of each trunnion 4, 4a is fixed a diametral bar 6, 6a respectively and these bars are connected by parallel spaced bars 7, 7a (Figures 4, 5, and 6).

The plates 1, 1a are also connected by four parallel angle bars 8 having their ends secured to rectangular thickened portions 9 of the rims of the flanges of the respective plates 1, 1a.

Plates 1 and 1a are also connected by angle bars 10 of which the ends are secured to square bosses 11 formed integrally with plates 1 and 1a.

Plates 1 and 1a support between them four pattern supporting tables 12a, 12b, 12c, and 12d which are arranged at right angles to one another to form a square drum.

Each pattern supporting table carries at each of its ends a V section guide member 13 co-operating with a guide member 14 of corresponding section fixed to the respective plates 1 or 1a, and each table is urged inwardly by springs 15 connected to lugs 16 attached to the tables by bolts 16a (Figures 4 and 6) passing through lugs 13a of the guide members 13 whereby the latter are also attached to their respective tables.

In order to limit the inward movement of the pattern supporting tables, triangular members 17, having abutments 17a, are fixed to the square bosses 11 (Figure 6).

Disposed within the space between the pattern supporting tables 12a . . . is a cylinder 20 (Figures 4, 5 and 7) supported on the parallel bars, 7, 7a by means of four posts 21 secured to the bars 7 and 7a, the cylinder carrying at its upper end transverse bars 22 which are secured to the top of said posts.

The piston rod 23 of this cylinder extends downwardly over the investing station and carries a ram 24, said ram having four downwardly projecting bosses 25. Each pattern supporting table 12a . . . is formed on its inner face with four bosses 26 which, when any pattern table such as table 17d in Figure 4 is at the investing station, are in register with bosses 25 on the ram 24 so that when the latter is moved downwardly, in the manner explained later, its bosses 25 engage the bosses 26 on the pattern table whereby the latter is pushed downwardly.

Each of the plates 1 and 1a is provided with an outwardly extending boss 27 and 27a respectively, each of which forms a bearing by means of which the corresponding plate 1 or 1a is rotatably supported on the corresponding fixed trunnion 4 or 4a.

Referring to the left-hand boss 27 on the plate 1 in Figures 1, 3, and 4, said boss 27 has fixed to it a sprocket wheel 28 which is connected by a chain 29 to a sprocket wheel 30 mounted on a stub shaft 31 supported in the standard 2, the chain 29 passing around idler sprockets 32.

A corresponding arrangement is provided at the right-hand side where the boss 27a has a sprocket 28a connected by a chain 29a (Figures 1 and 2) to a sprocket 30a on the right-hand end of shaft 31a.

Each sprocket 30, 30a has a spur wheel 33, 33a secured to it and said spur wheels respectively mesh with pinions 52, 52a secured to a shaft 50 driven from an electric motor 34 through mechanism hereinafter described.

Thus the assembly of plates 1, 1a and pattern supporting tables 12a . . . may be caused to rotate by rotation of the shaft 50.

When the apparatus is at rest one of the pattern tables (table 12d) in Figures 4 and 5 is disposed face downward over a container 35 for receiving the moulding mixture, this position being hereinafter referred to as the investing station.

Actuation of the piston within cylinder 20 moves the ram 24 downwardly so that the bosses 25 thereon engage the corresponding bosses 26 on the upper or inside surface of the downwardly facing pattern table at the investing station and pushes it down under pressure against the action of the springs 15 into the moulding mixture within the container 35.

Mounted above the mixture container 35 is a circular casing 36, (Figures 3 and 8) into the upper face of which and near its circumferential edge there opens out the lower end of a mixture supply hopper 40. The lower part 41 of the hopper 40 is internally conical and has disposed within it a conical member 42 suspended from a cable 43 passing over pulleys 44 and normally held up by a weight 45 in a position in which it engages the lower edge of a downward extension 40a of the part 40 of the hopper, the member 42 serving, in that position, to shut off the part 40 of the hopper from the part 41. If a predetermined weight of moulding mixture is charged into the hopper 40, the moulding mixture forces the member 42 downwardly thereby raising the weight 45 so that the mixture can pass from the hopper part 40 into the part 41 around the outside of the member 42 and thence under gravity into the casing 36, the weight 45 thereafter raising member 42 to the closed position.

By adjusting the weight 45, predetermined weights of moulding mixture may be delivered at intervals to the casing 36.

Disposed within the casing 36 are three horizontal blades 46 fixed to a vertical shaft 47 rotatable through a bevel gear 48 attached to shaft 47 (Figure 11) and meshing with another bevel gear 49 (Figure 8) secured to the shaft 50 which is mounted in bearings 51 and carries at its ends the pinions 52, 52a, said pinions meshing with the spur wheels 33, 33a, already referred to.

Secured to shaft 50 is a gear wheel 53, (Figures 8 and 10) with which meshes a tumbler gear 54 engaging with a pinion 55 secured to a shaft 56, the tumbler gear being rotatably mounted on an arm 57 pivoted about the shaft 56, the latter being mounted in bearings 58.

Shaft 56 is driven from the motor 34 by the following mechanism:

The motor drive shaft 60 carries a pulley 61 connected by belts 62 to a pulley 63 on a shaft 64 mounted in bearings 65. Shaft 64 carries a pinion 66 (Figure 8) meshing with another pinion 67 secured to a shaft 68 mounted in bearings 70 and carrying a worm 71 which drives a worm wheel 72 (Figure 2) secured to the shaft 56.

Thus, the shaft 56 is driven from the motor through the gearing described above and in turn drives shaft 50 through the pinion 55 and tumbler gear 54, the shaft 50 serving to drive the plates 1 and 1a carrying the pattern supporting tables through the pinions 52, 52a spur wheels 33, 33a and the chains 29, 29a and sprockets 30, 30a, and 28, 28a, while at the same time shaft 50 drives the vertical shaft 47 through the bevel gears 49, 48, said shaft 47 carrying the blades 46.

Thus, the blades 46 are caused to rotate in timed relation with the rotation of the plates 1 and 1a, the arrangement being such that the blades 46 make one revolution for each quarter revolution of the plates 1 and 1a, thereby ensuring a complete sweeping of the surface of the material in the container 35 prior to each and every investment operation.

During each revolution of the blades 46 they pick up moulding mixture deposited in the casing 36 from the hopper, 40, 41, convey it into the container 35 and distribute it over the surface of the mixture already in said container, thereby levelling said surface.

As already mentioned, when the apparatus is at rest, one of the pattern tables, (e. g. 12d) is facing downwardly at the investing station. In this position the next pattern table (12a) is vertical and facing outwardly at a handling station at the front of the apparatus, where it is accessible to the operator for the attachment of pattern thereto and for the removal of the moulded articles, a bench 75 being provided at the handling station.

At the same time the other two pattern tables (12b and 12c) are disposed within a curing oven 76 which embraces the corresponding half of the assembly constituted by the circular plates 1, 1a and pattern tables 12a . . . the oven being heated by means of hot air.

The curing oven 76 has a rear vertical wall 77 extending parallel to the axis about which the circular plates 1, 1a turn, and a roof 78 extending forwardly from the top of the rear wall over the rotatable assembly.

The oven also has two end walls 79 at right angles to the rear walls, the end walls being shaped to embrace the peripheries of the circular plates, and being connected by a front wall 80 extending down from the front of the roof to the peripheries of said circular plates.

The oven is heated by gas burners 82 supplied with gas through a pipe 83 fed from a gas main 84.

A centrifugal blower 85, driven through a belt 86 from an electric motor 87 (Figure 4) extracts heated air from the oven through a pipe 88 and delivers it to the oven again through a pipe 89 so that when the machine is in operation there is a continuous flow of hot air through the oven.

The tumbler gear 54 constitutes a clutch device through which the pattern table drum, including plates 1, 1a is driven and means is provided for automatically disengaging the tumbler gear 54 from the gear 53 when the drum has made a quarter of a revolution.

For this purpose the arm 57 is rocked about the shaft 56 by means of a piston 90 in a cylinder 91, (Figures 2, 8, 10 and 12) operated by compressed air in the manner explained below, said piston having its rod 92 connected by an L-shaped link 93 to the arm 57, by means of a pin 94 in link 93 engaging in a slot 95 in arm 57.

An air pipe 146 is connected to one end of the cylinder 91 and an air pipe 149 is connected to the other end thereof.

Mounted adjacent to the plate 1 is a valve 122a (Figure 2) actuated by an arm 103 (Figure 12) carrying a roller 104 disposed in the path of four trips 105 spaced at 90° apart around the plate 1a (Figure 2). These trips 105 are so positioned on the plate 1a that each time a pattern supporting table such as 12d arrives in position over the container 35, and below the ram 24, one of the trips 105 engages the roller 104 and operates the valve 122a.

The valve 122a forms part of a compressed air control system (shown in Figure 12) for controlling the stopping and starting of the rotatable drum including plate 1, 1a and tables 12a . . . 12d, and also for controlling the operation of ram 24 by means of cylinder 20.

Also included in the compressed air control system are means for ejecting finished mould-halves from the pattern plates.

Each pattern plate 106 is hollow and is provided with ejector pins 107 carried by an ejector plate 108 (Figure 17) slidable inside the pattern plate on pins 109 fixed to the latter, said ejector plate 108 being urged away from the pattern plate by springs 110 disposed around the pins 109.

The pattern, indicated at P (Figures 1, 5 and 17) is formed integrally on the outer surface of the pattern plate 106, and the latter is attached to the pattern supporting table (such as 12a in Figures 1 and 5) by means of bolts 111 passing through slots 112 in the table (12a) and through lugs 113 on the pattern plate 106.

In the apparatus now being described three sets of slots 112 are formed in each of the tables such as 12a to enable three pattern plates to be attached thereto at one time.

Each pattern plate 106, when in position, is disposed over an aperture 114 in the table, for example 12a, each of the tables being provided with three such apertures, and when any table is positioned at the handling station, the three apertures 114 therein are in front of three ejector rams 115 which when operated in the manner hereinafter described, pass forwardly through the respective apertures 114 and engage the rear faces of the ejector plates 108 of the pattern plates 106, to eject the half-moulds from the pattern plates.

The rams 115 are carried by a bar 116 to which are fixed the piston rods 117 of two operating cylinders 118, (Figures 7 and 12).

Referring to Figure 12 which shows the compressed air control system diagrammatically, the piston 90 in cylinder 91 controls the arm 57 carrying the tumbler gear 54 whereby stopping and starting of the rotatable drum comprising plates 1, 1a and tables 12a . . . 12d is effected. Movement of piston to the right in Figure 12 throws the gear 54 out of engagement and movement of piston to the left puts gear 54 into engagement.

The compressed air main 120 is connected through pipe 121 to the inlet port I of a manually operable control valve 122 shown in detail in Figure 13. Valve 122 comprises a casing formed with the inlet port I, outlet port O and exhaust port E. Slidably mounted in the casing is a plunger 123 urged outwardly by a spring 124 and carrying an external operating button 125. Plunger 123 is formed with a shoulder 126 which normally bears against a seating 127 formed on the inside of the casing to shut off the inlet port I from both the outlet and exhaust ports O and E. Above the shoulder 126 the plunger 123 is reduced in diameter to provide an annular passage 128 around it. Passages 129, 130 and 131 in the plunger 123 normally connect the outlet port O to the exhaust port E which is in communication with the atmosphere.

The outlet port O of valve 122 is connected through pipe 134 to the port P1 of a relay valve 135 which is shown in detail in Figure 14.

Valve 135 contains a plunger formed with a conical part 136 connected by a reduced portion 137 to a piston 138. Springs 139, 140 normally hold the plunger in the mid-position shown in Figure 14 in which the port P3 is shut off from the ports P1 and P2 by engagement of the conical part 136 with a seating 141, while ports P1 and P2 are in communication through a passage 142 formed in the plunger.

At the end adjacent the piston 138 the casing of valve 135 has a control port P4 for the admission of operating air, this port P4 being connected by pipe 144 to one of the outlet ports O of a valve 145 for a purpose to be explained later.

The port P2 of valve 135 is connected through pipe 146 to the right hand end of the cylinder 91, and its port P3 is in communication with the atmosphere.

The valve 122 initiates movement of piston 90 to the left and the return movement of said piston is initiated by a valve 122a of which the construction is identical with that of valve 122 except that the plunger is actuated by the arm 103 (Figure 12) carrying the roller 104 when the latter is engaged by one of the trips 105 (Figure 2).

The inlet I of valve 122a is directly connected to the main 120 through pipe 147 and the outlet O of valve 122a is connected through pipe 148 to the port P1 of a second relay valve 135a of which the construction is the same as that of valve 135. The port P2 of valve 135a is connected through pipe 149 to the left hand end of cylinder 91, and port P3 of valve 135a is in communication with the atmosphere.

When the apparatus is normally at rest one of the trips 105 is holding the roller 104 and, therefore, the plunger of valve 122a, depressed, so that air is admitted from main 120 through pipe 147, valve 122a, pipe 148, port P1 of valve 135a, passage 142 (Figure 14) port P2 of valve 135a and pipe 149 to the left hand end of cylinder 91 thereby holding piston 90 at the right hand end of the stroke and thus holding the gear 54 out of engagement.

To engage gear 54, button 125 of valve 122 is pressed, thereby admitting air from main 120 through pipe 121, valve 122, pipe 134, valve 135 and pipe 146 to the right hand end of cylinder 91.

In this condition piston 90 could not move as it would be subject to equal air pressure on both sides. In order to overcome this difficulty the outlet O of valve 122 is connected through pipe 150 to the control port P4 of relay valve 135a so that when button 135 is pressed an air pressure impulse passes along pipe 150 to the piston 138 (Figure 14) of valve 135a thereby moving the conical part 136 from its seat 141 and connecting the port P1 of valve 135a to its port P3, thus placing the left hand end of cylinder 90 in communication with the atmosphere.

In order to permit stopping of the rotatable assembly in any position, for example, in case of emergency, a third manual control valve 122b is provided of which the construction is identical with that of valve 122.

The inlet I of valve 122b is connected through pipe 151 to the main 120 and its outlet O is connected through pipe 152 to the exhaust E of the roller operated valve 122a.

By pressing the button 125b of valve 122b at any time during rotation of the pattern table assembly, air is admitted to the left hand end of cylinder 91 through pipe 151, valve 122b, pipe 152, valve 122a, pipe 148, relay valve 135a and pipe 149, whereby gear 54 is disengaged.

Referring again to Figure 12, downward movement of piston 20a in cylinder 20 to cause downward movement of ram 24 is initiated by pressing the button 125c of control valve 122c and upward movement of ram 24 is initiated by pressing the button 125d of control valve 122d.

The construction of valves 122c and 122d is the same as that of valve 122 shown in Figure 13.

The inlet I of valve 122c is connected through pipes 155 and 121 to the air main 120 while the outlet O of said valve is connected through pipe 156 to the port P4 of a relay valve 135b of which the construction is the same as that of valve 135 shown in Figure 14.

The port P3 of valve 135b is connected through pipes 157 and 121 to the air main 120 and the port P1 of valve 135b is connected through pipe 158 to the inlet I of a flow regulator 160 of which the outlet O is connected by pipe 161 to the upper end of cylinder 20.

The construction of flow regulator 160 is shown in Figure 15. This regulator comprising a casing within which is an axial valve spindle 162 carrying a valve head 163 cooperating with a seating 164, the spindle carrying a knurled sleeve 165 having an internal screw-thread engaging an external thread on the casing as shown at 166. By rotating the sleeve 165 the spindle 162 may be moved axially to bring the valve head 163 towards or away from the seating 164 thereby varying the rate of flow of air.

Valve 122d of which the inlet is connected to air main 120 through pipes 155a and 121a has its outlet similarly connected to the lower end of cylinder 20 through pipe 156a, relay valve 135c, and pipe 158a, flow regulator 160a and pipe 161a, the port P3 of valve 135c being connected to main 120 through pipes 157a and 121a.

Referring to Figures 4 and 7, pipe 161 passes to cylinder 20 through the hollow trunnion 4, and pipe 161a passes through the hollow trunnion 4a.

Assuming that piston 20a is at the top of its stroke and that it is desired to move it downwardly to operate ram 24 then button 125c is pressed, thereby connecting the inlet I of valve 122c to its outlet O whereby air flows from main 120 through pipes 121 and 155, valve 122c and pipe 156 to the control port P4 of relay valve 135b so that an impulse is given to the plunger 138 (Figure 14) of valve 135b and the said plunger is moved to connect the ports P1 and P3 so that air from main 120 passes through pipes 121 and 157 through valve 135b from port P3 to port P1 and thence through pipe 158, flow regulator 160 and pipe 161 to the upper end of cylinder 20 thereby moving piston 20a downwardly. The air pressure on piston 20a is maintained as long as button 125c is held depressed and when said button is released the air pressure to the control port P4 of valve 135b is cut off so that plunger 138 (Figure 14) rises and shuts off the port P1 of valve 135b from its port P3 and reestablishes communication between the ports P1 and P2 so that the pressure on top of piston 20a is relieved.

In order to return piston 20a to the top of its stroke button 125d of valve 122d is pressed, whereby air is admitted to the control port P4 of relay valve 135c through pipes 121a and 155a, valve 122d, and pipe 156a so that the plunger 138 of valve 135c is depressed and connects the port P3 of said valve to its port P1. Air then passes from pipe 121a through pipe 157a, port P3 of valve 135c, port P1 thereof, pipe 158a, flow regulator 160a and pipe 161a to the lower end of cylinder 20 whereby piston 20a is moved upwardly, the air above the piston escaping through pipe 161, flow regulator 160, pipe 158, through port P1 of valve 135b and thence to atmosphere through the port P2 of said valve.

In order to control the air supply to the cylinders 118 which actuate the ejector rams 115 carried by the bar 116 a single multi-port valve 145 having a push pull plunger 170 is provided. Referring to Figure 16 which illustrates this valve diagrammatically in cross section the valve comprises the casing 145 which has two exhaust ports E1 and E2 with an inlet port I disposed between them and, on the opposite side of the casing, two outlet ports O1 and O2.

The plunger 170 can occupy any one of three positions in which it is held by a spring loaded ball 171 engaging with a respective one of three recesses 172 formed in the plunger stem 173 which has an external operating knob 174.

In Figure 16 the plunger is shown in its neutral position in which the inlet is shut off from both outlets and the upper exhaust E1 is connected through passage 175 in the body of plunger 170 to the outlet O1 while exhaust E2 is connected through passage 176 to outlet O2.

If the plunger is pushed down the inlet is connected to outlet O2 through passage 177, 177a and both exhausts are closed as also is outlet O1.

If the plunger is pulled up inlet is connected to outlet O1 through passage 177, 177b while both exhausts and also outlet O2 are closed.

Referring to Figure 12, the inlet I of valve 145 is connected to the air main 120 by pipes 121a and 178, outlet O1 is connected to the inner ends of cylinders 118 through pipes 179 and 180, 180a, and outlet O2 is connected to the outer ends of said cylinders through pipes 181, 181a.

In order to move bar 116 carrying ejector rams 115 outwardly to eject a mould from the pattern plate, knob 174 is pulled out, whereby inlet I is connected to outlet O1 and air passes from pipe 121a through inlet I, outlet O1, pipes 179, 180 and 181 to the inner ends of cylinders 118. At the same time outlet O2 is placed in communication with exhaust E2 through passage 176 so that air from the outer ends of cylinders 118 is exhausted to atmosphere through pipes 181a, 181, outlet O2 and exhaust E2.

In order to return the bar 116 inwardly the knob 174 is pushed in to the fullest extent whereby inlet I is connected to outlet O2 and air passes from pipe 121a through inlet I, outlet O2 pipes 181 and 181a to the outer ends of cylinders 118. At the same time outlet O1 is placed in communication with exhaust E1 through passage 175 so that air from the inner ends of cylinders 118 is exhausted to atmosphere through pipes 180, 180a, 179, outlet O1 and exhaust E1.

In order to prevent starting up of the assembly comprising plates 1 and 1a and tables 12a . . . should the operator fail to return the bar 116 and rams 115 to the inner position, the outlet O1 of valve 145 is connected through pipe 144 to the control port P4 of valve 135. As long as the plunger 170 of valve 145 is left in its outer position so that outlet O1 is connected to the air supply the air pressure will be acting on the piston 138 (Figure 14) of valve 135 whereby the inlet I of valve 135 is maintained connected to its exhaust E. If now button 125 is pressed to start the rotating assembly the air will pass from pipe 121 through valve 122 and pipe 134 to the inlet of valve 135 and thence straight out to atmosphere through the exhaust E of said valve 135 so that the piston 90 for effecting engagement of gear 54 is not operated and gear 54 remains out of engagement.

The manner of operating the machine will now be briefly described.

Before the gas burners 82 within the oven 76 are lit the pattern tables are loaded with pattern plates while they are still cold. In the first place the table, such as 12a, which is at the handling station above bench 75 is loaded with pattern plates 106, the latter being attached to the table by means of the bolts 111 passing through the lugs 113 of the plates 106 and the slots 112 in the table.

Button 125 (Figure 12) is then pressed to effect engagement of gear 54 with gear 53 whereby the drum is caused to rotate counterclockwise in Figures 2 and 5. When the drum has made a quarter of a revolution one of the trips 105 engage the roller 104 (Figures 2 and 12) thereby operating valve 122a to stop the rotating drum with the next table 12b at the handling station.

This table 12b is then loaded with pattern plates 106 and button 125 is again pressed to set the drum in rotation. After another quarter of a revolution the drum stops again with the table 12c at the handling station. Table 12c is then loaded with patterns and thereinafter in a similar manner table 12d is loaded.

After all the tables have thus been loaded the gas burners 82 are lit and the blower 85 is started to provide a circulation of hot gases through the oven.

Button 125 is then depressed and held depressed for about half an hour to cause continuous rotation of the drum until the tables and pattern plates have become sufficiently heated.

In order thus to maintain button 125 depressed, a catch (not shown) may be provided.

At the end of this period button 125 is released so that the drum stops with one of the tables, say 12a, at the handling station.

The temperature maintained within the oven is of the order of 300° C. to 350° C. and the working temperature of the pattern plates at the investing station is about 160° C.

Patterns on table 12a are sprayed with wax and button 125 is then pressed again to bring table 12b to the loading station, and table 12a to the investing station over container 35.

The operator now presses button 125c thereby admitting compressed air to the upper end of cylinder 20 to force its piston downwardly together with ram 24. The projections 25 on ram 24 engage the corresponding projections 26 on the inside face of table 12a (shown for table 12d in Figure 4) and table 12a is forced down to press its heated patterns into the mixture in container 35, the pressure employed being about 80 lbs. per square inch.

The operator holds button 125c depressed for six to eight seconds in order to allow the requisite thickness of coating to form on the pattern, and then depresses button 125d to withdraw ram 24 and permit table 12a with its coated patterns to rise to its normal position under the action of springs 15.

The patterns on table 12b which at this time is at the loading station are then sprayed with wax, and button 125 is pressed to cause a further quarter of a revolution of the table assembly, which brings table 12a with its coated patterns, into the oven 76, table 12b to the investing station and table 12c to the handling station.

The patterns on table 12b are then invested or coated with moulding material by operation of cylinder 20 and ram 24, after which the patterns on table 12c are sprayed with wax, and the table assembly is rotated a further quarter of a revolution, bringing table 12a further into the oven 76, table 12b from the investing station into the oven, table 12c to the investing station and table 12d to the handling station.

The patterns on table 12c are then invested or coated by operation of ram 24, the patterns on table 12d are sprayed with wax, and the table assembly is again rotated a quarter of a revolution.

This brings table 12a back to the handling station after its passage through oven 76 during which the coatings of moulding mixture on its patterns have been cured and will now have set sufficiently for them to be removed. The operator, therefore, now pulls out the knob 174 of valve 145 whereby the pistons of cylinders 118 are moved outwardly to operate the ejector rams 115, which, passing through the apertures 114 in the table 12a actuate the ejector plates 108 to eject the mould halves, constituted by the cured coating, from the patterns.

The operator then pushes knob 174 in to effect the return of the ejector rams 115.

Ram 24 is then operated to effect investment of the patterns of table 12d, which is now at the investing station, and the patterns of table 12a are sprayed with wax. After withdrawal of ram 24, button 125 is pressed to effect another quarter revolution of the table assembly, thereby bringing table 12a over the container 35 for another investment operation, and table 12d to the handling station for stripping of the cured coatings from its patterns and for re-spraying with wax in readiness for investment when it reaches the investment station again.

Thereafter at each successive quarter revolution of the table assembly, the cured coatings or mould halves are stripped from the patterns of one table, which patterns are then re-sprayed with wax, the patterns of another table are coated with moulding mixture by operation of ram 24, while the coatings on the patterns of the two other tables are being cured within the oven 76.

As already explained, during each quarter revolution of the table assembly, the blades 46 make one complete revolution, thereby completely sweeping and levelling the surface of the material in container 35 between successive investment operations.

I claim:

1. In apparatus for making moulds and parts thereof, for casting metals, from a dry moulding mixture of the kind referred to, the combination of a plurality of patterns, pattern supports on which said patterns are mounted, an oven, an investment station, means for moving each pattern support in turn from said investment station, through said oven and back to said investment station, a container for moulding mixture adjacent to said investment station, means for moving each pattern support, when at the investment station, towards said container and for applying moulding mixture within said container to a corresponding pattern under a pressure and for a time sufficient to cause the pattern to become invested with a coating of the moulding mixture, and means for removing said coating of moulding mixture from the pattern after said coating has been cured by passage through the oven.

2. In apparatus for making moulds and parts thereof, for casting metals, from a dry moulding mixture of the kind referred to, the combination of two coaxially rotatable carrier members, a plurality of pattern supports in the form of flat tables arranged to form a polygonal drum coaxial with and disposed between said carrier members, means on said carrier members supporting said tables and guiding them for radial movement relatively to said carrier members, an oven, a container for moulding mixture disposed below the drum, means for rotating the drum intermittently to bring each table in turn from a first station to an investing station at which it is located over the mixture container, and thence through said oven back to said first station, and means located at the investing station to engage each table, when positioned at said investing station, and push it under pressure into the container.

3. Apparatus according to claim 2 for use with pattern plates which are attachable to the pattern supporting tables and have a device for ejecting a finished mould from the pattern, and wherein each supporting table has openings over each of which a pattern plate can be mounted, said apparatus including an ejector ram mounted on fixed supports within the drum, and in register with one of the openings in a supporting table, when positioned at the first station, and means operable, when said table is at the first station, to move said ram through said opening.

4. Apparatus according to claim 2 including a charging hopper having a delivery end disposed over the moulding mixture container, and a sweeper element rotatable within said container and beneath the delivery end of said hopper.

5. Apparatus according to claim 2 for use with pattern plates which are attachable to the supporting tables and have a device for ejecting a finished moulded article from the pattern, said apparatus including means located at the first station, and operable to actuate the ejecting device of the pattern plate, when a table to which it is attached is positioned at said station.

6. In apparatus for making moulds and parts thereof, for casting metals, from a dry moulding mixture of the kind referred to, the combination of two coaxial rotatable carrier members, a plurality of pattern supporting tables mounted between said carrier members and arranged to form a polygonal drum, means guiding said tables for radial movement relatively to said carrier members, an oven, a container for moulding mixture disposed below the drum, means for rotating the carrier members and tables intermittently to bring each table in turn from a first station to an investing station at which it is located over the mixture container, and thence through the oven back to said first station, a ram mounted above the container and within said drum, means operable when a table is positioned over said container to actuate said ram to press the table down into the container, and spring means for returning the table on withdrawal of the ram.

7. Apparatus according to claim 2 including a plurality of trip members, one for each table, said trip members being rotatable with the drum, and a switch device operable by one of said trip members to arrest the movement of the drum each time a table arrives in position at the investment station.

8. An apparatus for making moulds and parts thereof for casting metals from a dry moulding mixture of the kind referred to; comprising a container for holding moulding mixture, a plurality of patterns, a plurality of supports for said patterns, means for heating said patterns on said pattern supports, means for moving in turn each pattern support with heated pattern attached so that it is located adjacent said container, means for moving the heated pattern into contact with said moulding mixture and pressing said pattern against said moulding mixture within said container, until a coating of moulding mixture of sufficient thickness adheres to the heated pattern, means for withdrawing the heated pattern with adherent coating of moulding mixture from contact with surplus mixture remaining in said container, and means for further heating the said coating of molding mixture until said coating has attained requisite strength.

9. An apparatus for making moulds and parts thereof for casting metals from a dry moulding mixture of the kind referred to; comprising a container for holding moulding mixture, a plurality of patterns, a plurality of supports for said patterns, means for heating said patterns on said pattern supports, means for moving in turn each pattern support with heated pattern attached so that it is located adjacent said container, means for moving the heated pattern into contact with said moulding mixture and pressing said pattern against said moulding mixture within said container, until a coating of moulding mixture of sufficient thickness adheres to the heated pattern, means for withdrawing said heated pattern with adherent coating of moulding mixture from contact with surplus mixture remaining in said container, means for further heating the said coating of moulding mixture until said coating has attained requisite strength, and means for detaching the finished coating from said pattern.

References Cited in the file of this patent

UNITED STATES PATENTS

| | | |
|---|---|---|
| 2,183,869 | Randall et al. | Dec. 19, 1939 |
| 2,254,263 | Bratring | Sept. 2, 1941 |
| 2,299,269 | Gammeter | Oct. 20, 1942 |
| 2,389,319 | McMordie et al. | Nov. 20, 1945 |
| 2,669,758 | Valyi | Feb. 23, 1954 |

FOREIGN PATENTS

| | | |
|---|---|---|
| 832,934 | Germany | Mar. 3, 1952 |
| 496,629 | Belgium | July 15, 1950 |